United States Patent
Xie et al.

(10) Patent No.: US 12,286,176 B2
(45) Date of Patent: Apr. 29, 2025

(54) METHOD FOR ESTIMATING POSE OF HUMANOID ROBOT, HUMANOID ROBOT AND COMPUTER-READABLE STORAGE MEDIUM

(71) Applicant: UBTECH ROBOTICS CORP LTD, Shenzhen (CN)

(72) Inventors: Yan Xie, Shenzhen (CN); Mingguo Zhao, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 209 days.

(21) Appl. No.: 18/113,625

(22) Filed: Feb. 24, 2023

(65) Prior Publication Data
US 2023/0264765 A1 Aug. 24, 2023

Related U.S. Application Data

(63) Continuation of application No. PCT/CN2020/140924, filed on Dec. 29, 2020.

(30) Foreign Application Priority Data

Aug. 25, 2020 (CN) .......................... 202010862104.9

(51) Int. Cl.
*B62D 57/032* (2006.01)
*B25J 9/00* (2006.01)
*B25J 9/16* (2006.01)

(52) U.S. Cl.
CPC .......... *B62D 57/032* (2013.01); *B25J 9/1653* (2013.01); *B25J 9/1664* (2013.01)

(58) Field of Classification Search
CPC ...... B62D 57/032; B62D 57/02; B25J 9/1653; B25J 9/1664; B25J 9/0006; B25J 9/1651; B25J 9/00; B25J 9/16; G05B 2219/40264
See application file for complete search history.

(56) References Cited

U.S. PATENT DOCUMENTS

| | | | |
|---|---|---|---|
| 2005/0126833 A1* | 6/2005 | Takenaka | B25J 13/088 180/8.1 |
| 2009/0005906 A1* | 1/2009 | Tajima | B62D 57/032 901/1 |

(Continued)

FOREIGN PATENT DOCUMENTS

| | | | | |
|---|---|---|---|---|
| CN | 108621161 A | | 10/2018 | |
| CN | 109703645 A | * | 5/2019 | ............ B25J 13/089 |
| JP | 2008068339 A | * | 3/2008 | |

OTHER PUBLICATIONS

Ma et al., "Online Gait Planning of Lower-Limb Exoskeleton Robotic for Paraplegic Rehabilitation Considering Weight Transfer Process," Feb. 14, 2020 (Year: 2020).*

(Continued)

*Primary Examiner* — Adam R Mott
*Assistant Examiner* — Byron Xavier Kasper

(57) ABSTRACT

A method for estimating a pose of a humanoid robot includes: processing obtained pose parameters of a waist of the humanoid robot and plantar motion parameters of the humanoid robot to obtain the measured pose parameters of a center point of the waist of the humanoid robot; calculating predicted pose parameters of the center point of the waist according to the obtained pose parameters of the waist; and fusing the measured pose parameters and the predicted pose parameters to obtain estimated pose parameters of the center point of the waist.

20 Claims, 8 Drawing Sheets

(56) References Cited

U.S. PATENT DOCUMENTS

| | | | | |
|---|---|---|---|---|
| 2011/0301756 A1* | 12/2011 | Yoshiike | .............. | B62D 57/032 |
| | | | | 901/1 |
| 2012/0310412 A1* | 12/2012 | Seo | ........................ | B25J 9/0006 |
| | | | | 700/254 |
| 2020/0333790 A1* | 10/2020 | Kobayashi | .............. | G01S 17/89 |

OTHER PUBLICATIONS

ISR for PCT/CN2020/140924.
Written opinions of ISA for PCT/CN2020/140924.
"Gait Planning and Balance Control of Biped Humanoid Robot", Xiang Yuanfel, "China Excellent Master's Thesis Full-text Database Information Technology Series", pp. 27-66.

\* cited by examiner

METHOD FOR ESTIMATING POSE OF HUMANOID ROBOT, HUMANOID ROBOT AND COMPUTER-READABLE STORAGE MEDIUM

CROSS REFERENCE TO RELATED APPLICATIONS

The present application is a continuation-application of International Application PCT/CN2020/140924, with an international filing date of Dec. 29, 2020, which claims foreign priority to Chinese Patent Application No. 202010862104.9, filed on Aug. 25, 2020 in the China National Intellectual Property Administration, the contents of all of which are hereby incorporated by reference in its entirety.

TECHNICAL FIELD

The present disclosure generally relates to robots, and particularly to a method for an estimating the pose of a humanoid robot and a humanoid robot.

BACKGROUND

Humanoid robots have the ability to walk and operate in real space. When controlling humanoid robots, it can be optimized from multiple aspects such as the body structure, actuators, control strategies, and state estimation of humanoid robots, thereby improving the control effect of the humanoid robots.

In the state estimation of a humanoid robot, the state estimation of the waist point of the humanoid robot has a great influence on the humanoid robot. The state estimation of the waist point can not only accurately and objectively describe the state of the humanoid robot in the world coordinate system, but also provide high-quality feedback signals for the control of the humanoid robot, thereby ensuring the control effect of the humanoid robot.

Some conventional state estimation methods for the waist point of humanoid robots have the drawback of low precision, resulting in poor control effect of humanoid robots.

Therefore, there is a need to provide a method for estimating the pose of a humanoid robot to overcome the above-mentioned problem.

BRIEF DESCRIPTION OF DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
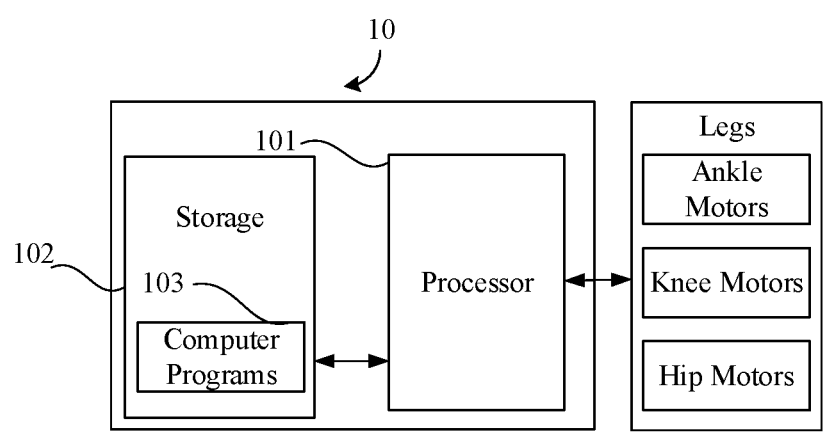
FIG. 1 is a schematic block diagram of a humanoid robot according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

In some scenarios of waist state estimation for humanoid robots, some conventional methods are based on kinematic modeling and solving or prediction based on inertial measurement unit (IMU) signals. For example, in one solution based on kinematic modeling, multiple sensors can be installed inside a humanoid robot to collect the attitude information of the humanoid robot. Based on an established kinematic model, the motion state of a center point of the waist of the humanoid robot is calculated to realize the pose state estimation of the humanoid robot including the center point of the waist. Alternatively, in another solution based on IMU signal prediction, linear acceleration signals of the humanoid robot are obtained by using the IMU arranged on the humanoid robot. The motion state of the waist point can then be predicted through a preset prediction model, so as to realize the pose state estimation for the humanoid robot.

The above-mentioned pose state estimation strategies for humanoid robots have the drawback of low accuracy. Specifically, as for the above-mentioned solution based on kinematics solving, since there is a lot of noise information in the measured values of the sensors, especially the spike noise generated by the impact and vibration when the foot of a swing leg of the humanoid robot touches a support surface (e.g., ground, floor, etc.), the estimated waist state has a lot of noise information, and the accuracy is low. As for the solution based on IMU signal prediction, the accuracy of this solution mainly depends on the accuracy of the prediction model. When the prediction model deviates from the actual robot trajectory, the estimation of the waist state will drift with time, and the accuracy will be adversely affected.

In order to solve the above problems, the present disclosure proposes a method that includes: processing obtained pose parameters of a waist of the humanoid robot and plantar motion parameters of the humanoid robot to obtain the measured pose parameters of a center point of the waist of the humanoid robot; calculating predicted pose parameters of the center point of the waist according to the obtained pose parameters of the waist; and fusing the measured pose parameters and the predicted pose parameters to obtain estimated pose parameters of the center point of the waist.

By implementing the method above, not only the drift phenomenon that occurs when only using the IMU predicted result can be avoided, but also the noise that occurs when only using kinematics solving is avoided, thereby improving the estimation accuracy of the waist state parameters of the humanoid robot.

Figure 2:
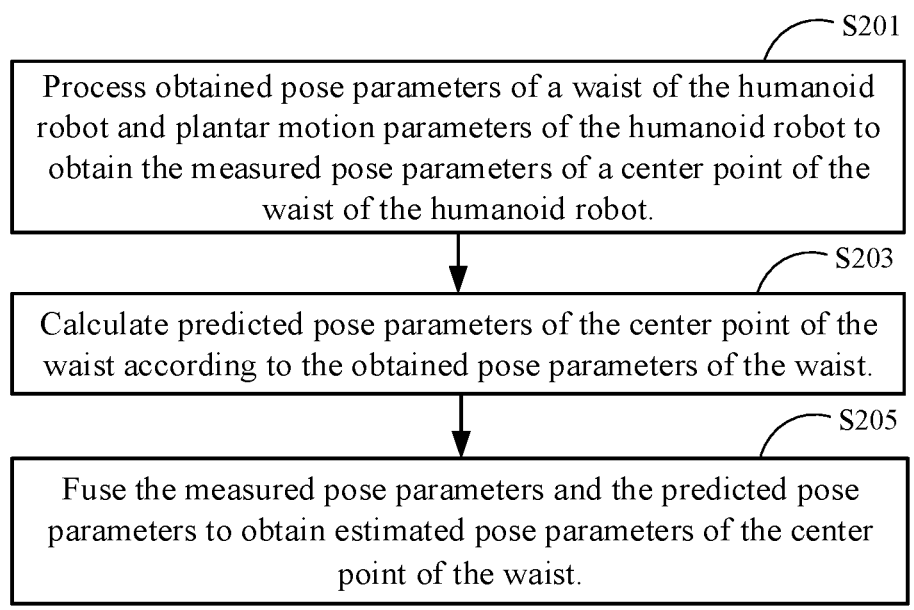
FIG. 2 is an exemplary flowchart of a method for estimating the pose of the humanoid robot according to one embodiment.

FIG. 1 shows a schematic block diagram of a humanoid robot 10 according to one embodiment. The robot 10 may include a processor 101, a storage 102, and one or more executable computer programs 103 that are stored in the storage 102. The storage 102 and the processor 101 are directly or indirectly electrically connected to each other to realize data transmission or interaction. For example, they can be electrically connected to each other through one or more communication buses or signal lines. The processor 101 performs corresponding operations by executing the executable computer programs 103 stored in the storage 102. When the processor 101 executes the computer programs 103, the steps in the embodiments of the method for controlling the robot, such as steps S201 to S205 in FIG. 2, are implemented.

The processor 101 may be an integrated circuit chip with signal processing capability. The processor 101 may be a central processing unit (CPU), a general-purpose processor, a digital signal processor (DSP), an application specific integrated circuit (ASIC), a field-programmable gate array (FPGA), a programmable logic device, a discrete gate, a transistor logic device, or a discrete hardware component. The general-purpose processor may be a microprocessor or any conventional processor or the like. The processor 101 can implement or execute the methods, steps, and logical blocks disclosed in the embodiments of the present disclosure.

The storage 102 may be, but not limited to, a random-access memory (RAM), a read only memory (ROM), a programmable read only memory (PROM), an erasable programmable read-only memory (EPROM), and an electrical erasable programmable read-only memory (EEPROM). The storage 102 may be an internal storage unit of the robot, such as a hard disk or a memory. The storage 102 may also be an external storage device of the robot, such as a plug-in hard disk, a smart memory card (SMC), and a secure digital (SD) card, or any suitable flash cards. Furthermore, the storage 102 may also include both an internal storage unit and an external storage device. The storage 102 is used to store computer programs, other programs, and data required by the robot. The storage 102 can also be used to temporarily store data that have been output or is about to be output.

Figure 8:
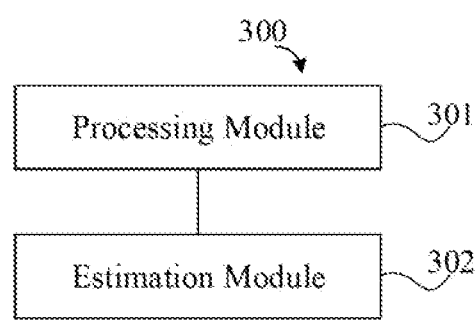
FIG. 8 is schematic block diagram of a robot pose estimation device according to one embodiment.

Exemplarily, the one or more computer programs 103 may be divided into one or more modules/units, and the one or more modules/units are stored in the storage 102 and executable by the processor 101. The one or more modules/units may be a series of computer program instruction segments capable of performing specific functions, and the instruction segments are used to describe the execution process of the one or more computer programs 103 in the robot. For example, the one or more computer programs 103 may be divided into a processing module 301 and an estimation module 302 as shown in FIG. 8.

In one embodiment, the humanoid robot may include two legs having ankle motors, knee motors, and hip motors that are electrically connected to the processor 101. It should be noted that the block diagram shown in FIG. 1 is only an example of the robot. The robot may include more or fewer components than what is shown in FIG. 1, or have a different configuration than what is shown in FIG. 1. Each component shown in FIG. 1 may be implemented in hardware, software, or a combination thereof.

In one embodiment, a method for estimating the oppose of the humanoid robot 10 may include the following steps.

Step S201: Process obtained pose parameters of a waist of the humanoid robot and plantar motion parameters of the humanoid robot to obtain the measured pose parameters of a center point of the waist of the humanoid robot.

Step S203: Calculate predicted pose parameters of the center point of the waist according to the obtained pose parameters of the waist.

Step S205: Fuse the measured pose parameters and the predicted pose parameters to obtain estimated pose parameters of the center point of the waist.

Figure 3:
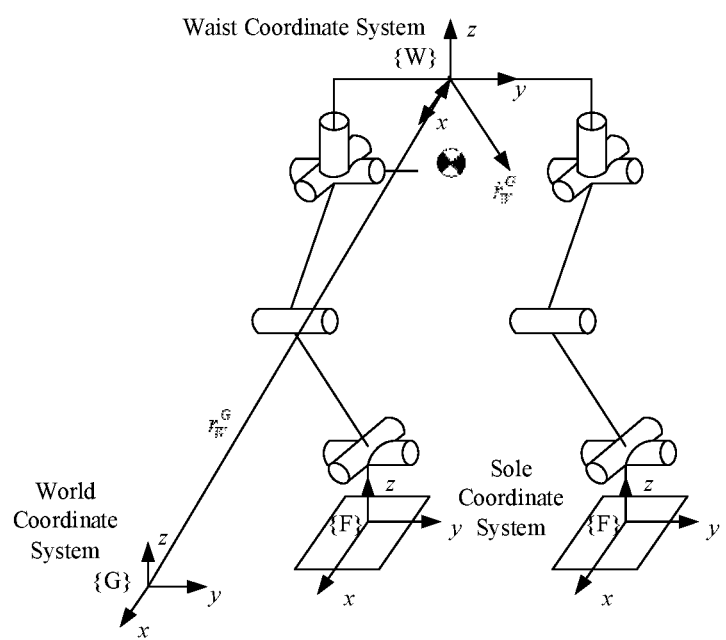
FIG. 3 is a schematic diagram showing multiple coordinate systems established for the humanoid robot.

Referring to FIG. 3, in one embodiment, a world coordinate system {G}, a waist coordinate system {W} based on the center point of the waist of the humanoid robot, and a sole coordinate system {F} based on the soles of the humanoid robot can be pre-established.

In one embodiment, the origin of the world coordinate system can be a pre-configured point. The origin of the waist coordinate system can be the predetermined center point of the waist of the humanoid robot, and the center point of the waist can be a point selected near the waist of the humanoid robot. Alternatively, the origin of the waist coordinate system may also be the geometric center of the waist of the humanoid robot. The origin of the sole coordinate system may be the center of one foot of the humanoid robot.

Depending on the number of feet of the humanoid robot, multiple foot coordinate systems can be established. For example, as shown in FIG. 3, the humanoid robot may include two legs and two feet, and two sole coordinate systems can be established. The origins of the two sole coordinate systems can be the center points of the soles of the two feet respectively.

In one embodiment, an IMU can be arranged at the waist of the humanoid robot. For example, the IMU can be arranged at the center point of the waist of the humanoid robot. Pose parameters of the waist of the humanoid robot can be collected using the IMU. The pose parameters of the waist may include attitude angles and angular velocities of the center point of the waist of the humanoid robot in the world coordinate system, and the linear acceleration of the center point of the waist of the humanoid robot in the waist coordinate system. Exemplarily, the attitude angles of the center point of the waist in world coordinate system is referred to as the waist attitude angles. The attitude angular velocities of the center point of the waist in world coordinate system is referred to as the waist attitude angular velocities. The linear acceleration of the center point of the waist in the waist coordinate system is referred to as the first waist linear acceleration.

In one embodiment, detection sensors can be arranged at each joint of the humanoid robot to obtain information such as displacement parameters and angular velocity parameters of each joint of the humanoid robot. For example, displacement sensors can be installed on the legs of the humanoid robot to collect information on each joint of the legs of the humanoid robot, such as collecting plantar motion parameters (e.g., plantar displacement parameters and angular velocity parameters) of the humanoid robot.

In this way, when estimating the pose of the humanoid robot, the humanoid robot can first process the obtained pose parameters of the waist and plantar motion parameters of the humanoid robot. For example, kinematics solving can be used to process the pose parameters of the waist and measured pose parameters to obtain the measured pose parameters of the center point of the waist of the humanoid robot. The measured pose parameters may represent the pose parameters calculated by using the measured measurement parameters of the humanoid robot.

In addition, the humanoid robot can also calculate the predicted pose parameters of the center point of the waist of the humanoid robot by using methods such as coordinate conversion and kinematic solving based on the obtained pose parameters of the waist of the humanoid robot. The predicted pose parameters can represent the pose parameters of the humanoid robot predicted by using the measured measurement parameters of the humanoid robot.

It should be noted that the above-mentioned step S201 and step S203 do not necessarily have to be executed sequentially. It may be that step S201 is executed first and then step S203 is executed, or step S203 is executed first and then step S201 is executed, which is not limited here. In addition, step S201 and step S203 may be executed simultaneously.

Next, the humanoid robot can fuse the measured pose parameters and predicted pose parameters obtained above, for example, filtering and fusing these parameters, so as to obtain the estimated pose parameters of the center point of the waist of the humanoid robot.

According to the method above, the obtained pose parameters of the waist of the humanoid robot and plantar motion parameters of the humanoid robot are processed to obtain the measured pose parameters of a center point of the waist of the humanoid robot. Then, predicted pose parameters of the center point of the waist are calculated according to the obtained pose parameters of the waist. The measured pose parameters and the predicted pose parameters are then fused to obtain estimated pose parameters of the center point of the waist. By obtaining estimated pose parameters of the center point of the waist of the humanoid robot by combining kinematics solving and IMU predicted result, not only the drift phenomenon that occurs when only using the IMU predicted result can be avoided, but also the noise that occurs when only using kinematics solving is avoided, thereby improving the estimation accuracy of the waist state parameters of the humanoid robot.

In one embodiment, when calculating the measured pose parameters of the humanoid robot, the sole(s) of the humanoid robot is considered to be in contact with the support surface by default. Therefore, according to coordinates of the origin of one pre-set sole coordinate system, combined with the acquired plantar motion parameters, the solving process is performed to obtain the measured pose parameters of the humanoid robot.

In some application scenarios, the sole(s) of the humanoid robot may not be in full contact with the support surface, for example, when the robot walks on tiptoes. In this case, the soles of the humanoid robot are tilted, resulting in that the soles of the humanoid robot are not in full contact with the support surface. As a result, the centers of the soles of the humanoid robot change, and the calculated measured pose parameters have errors.

Figure 4:
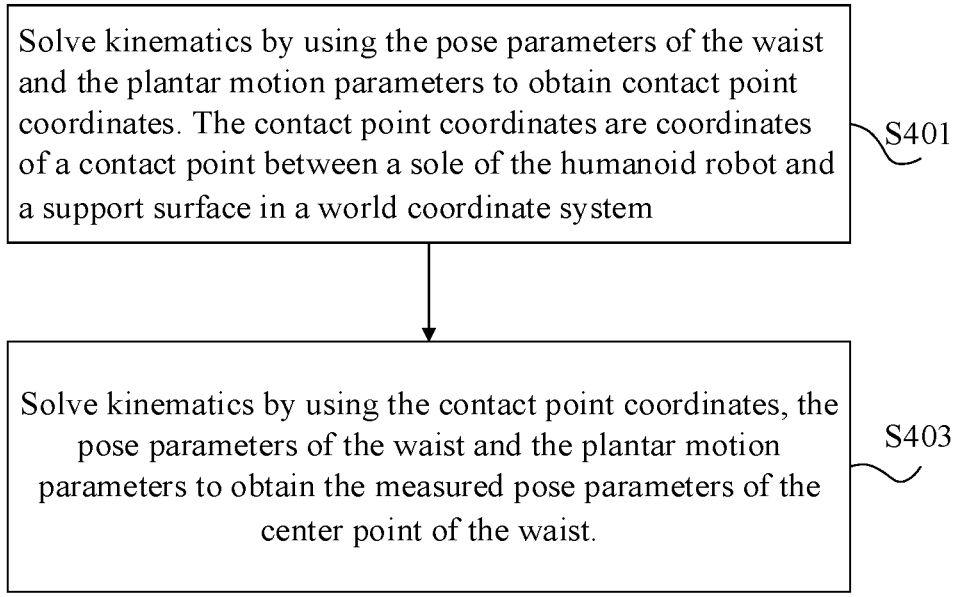
FIG. 4 is an exemplary flowchart of a method for obtaining the measured pose parameters of the center point of the waist according to one embodiment.

Referring to FIG. 4, in one embodiment, in order to solve the above-mentioned problem, step S201 may include the following steps.

Step S401: Solve kinematics by using the pose parameters of the waist and the plantar motion parameters to obtain contact point coordinates. The contact point coordinates are coordinates of a contact point between a sole of the humanoid robot and a support surface in a world coordinate system.

Step S403: Solve kinematics by using the contact point coordinates, the pose parameters of the waist and the plantar motion parameters to obtain the measured pose parameters of the center point of the waist.

Considering that the sole(s) of the humanoid robot may be tilted, for example when the robot stands/walks on tiptoes, when performing step 201, the humanoid robot can first perform kinematic solving based on the pose parameters of the waist and the plantar motion parameters to obtain coordinates of the contact point(s) of the sole(s) of the humanoid robot with the support surface in the world coordinate system.

In one embodiment, the plantar motion parameters may include plantar displacement parameters of the humanoid robot. When the humanoid robot performs kinematic solving to obtain the contact point coordinates of the sole(s) of the humanoid robots, it can first perform kinematics solving based on the attitude angles and the plantar displacement parameters to obtain the attitude angles of the sole(s) of the humanoid robot. The attitude angles are the attitude angles of the sole(s) of the humanoid robot in the world coordinate system, which may include the roll angle, pitch angle and yaw angle of the sole(s) of the humanoid robot.

Next, the humanoid robot can search for the coordinates of the initial contact point(s) corresponding to the attitude angles of the sole(s) in the posture configuration strategy according to the preset pose configuration strategy. The initial contact point coordinates are the coordinates of the contact point(s) between the sole(s) of the humanoid robot and the support surface in the sole coordinate system.

Figure 5:
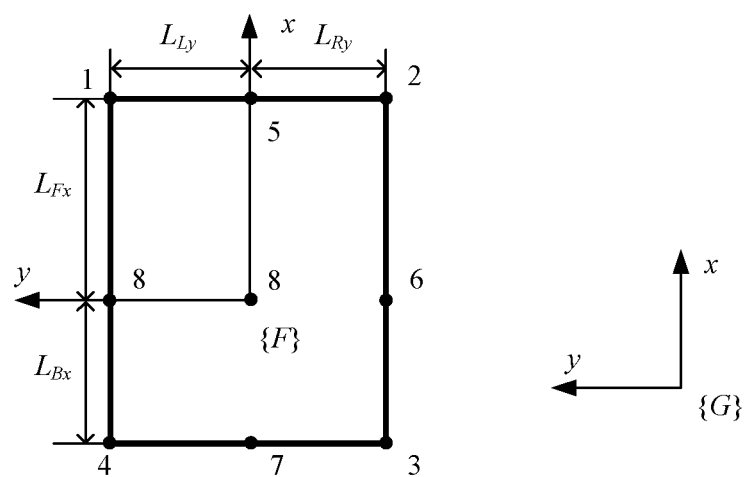
FIG. 5 is a schematic diagram showing contact points of sole(s) of the humanoid robot according to one embodiment.

The pose configuration strategy may include the coordinates of the contact point(s) in the sole coordinate system when the sole(s) is in different poses. For example, as shown in FIG. 5, when establishing the sole coordinate system $\{G\}$, the center point (point 9 in FIG. 5) of a sole can be used as the origin of the sole coordinate system. According to the size of the sole of the humanoid robot, the coordinates of the multiple contact points determined on the sole in the sole coordinate system can be pre-configured.

Exemplarily, as shown in FIG. 5, the pose configuration strategy can be expressed as follows.

When the roll angle of the plantar attitude angles is less than zero and the pitch angle of the plantar attitude angles is greater than zero, the contact point between the sole and the ground is point 1, and the coordinates of the initial contact point are expressed as follows: $r_{Contact}^{F}=(L_{Fx}\ L_{Fy}\ 0)^{T}$.

When the roll angle of the plantar attitude angles is greater than zero and the pitch angle of the plantar attitude angles is greater than zero, the contact point between the sole and the ground is point 2, and the coordinates of the initial contact point are expressed as follows: $r_{Contact}^{F}=(L_{Fx}\ -L_{Ry}\ 0)^{T}$.

When the roll angle of the plantar attitude angles is greater than zero and the pitch angle of the plantar attitude angles is less than zero, the contact point between the sole and the ground is point 3, and the coordinates of the initial contact point are expressed as follows: $r_{Contact}^{F}=(-L_{Bx}\ -L_{Ry}\ 0)^{T}$.

When the roll angle of the plantar attitude angles is less than zero and the pitch angle of the plantar attitude angles is less than zero, the contact point between the sole and the ground is point 4, and the coordinates of the initial contact point are expressed as follows: $r_{Contact}^{F}=(-L_{Bx}\ L_{Ly}\ 0)^{T}$.

When the roll angle of the plantar attitude angles is equal to zero and the pitch angle of the plantar attitude angles is greater than zero, the contact point between the sole and the ground is point 5, and the coordinates of the initial contact point are expressed as follows: $r_{Contact}^{F}=(L_{Fx}\ 0\ 0)^{T}$.

When the roll angle of the plantar attitude angles is greater than zero and the pitch angle of the plantar attitude angles is equal to zero, the contact point between the sole and the ground is point 6, and the coordinates of the initial contact point are expressed as follows: $r_{Contact}^{F}=(0\ -L_{Ry}\ 0)^{T}$.

When the roll angle of the plantar attitude angles is equal to zero and the pitch angle of the plantar attitude angles is less than zero, the contact point between the sole and the ground is point 7, and the coordinates of the initial contact point are expressed as follows: $r_{Contact}^{F}=(-L_{Bx}\ 0\ 0)^{T}$.

When the roll angle of the plantar attitude angles is less than zero and the pitch angle of the plantar attitude angles is equal to zero, the contact point between the sole and the ground is point 8, and the coordinates of the initial contact point are expressed as follows: $r_{Contact}^{F}=(0\ L_{Ly}\ 0)^{T}$.

When the roll angle of the plantar attitude angles is equal to zero and the pitch angle of the plantar attitude angles is equal to zero, the contact point between the sole and the ground is point 9, and the coordinates of the initial contact point are expressed as follows: $r_{Contact}^{F}=(0\ 0\ 0)^{T}$.

Then, the humanoid robot can convert the coordinates of the initial contact point in the sole coordinate system to coordinates in the world coordinate system to obtain the coordinates of the contact point of the sole.

It should be noted that in an initial state, the soles of the humanoid robots are generally in full contact with the support surface. In this state, the plantar coordinate systems are generally parallel to the world coordinate system. The position of the plantar coordinate system in the world coordinate system in the initial state is represented by $r_{F\_init}^{G}$. The coordinates of the contact point can be expressed as follows: $r_{Contact}^{G}=r_{Contact}^{F}+r_{F\_init}^{G}$, where $r_{Contact}^{G}$ represents the coordinates of the contact point of the sole, and $r_{Contact}^{F}$ represents the coordinates the coordinates of the initial contact point.

Based on these, the humanoid robot can use the coordinates of the contact point of the sole obtained above, combined with the above-mentioned plantar motion parameters and pose parameters of the waist to perform kinematics solving, and obtain the measured pose parameters of the center point of the waist of the humanoid robot. In this way, when the humanoid robot calculates the measured pose parameters, it can take into account calculation errors caused by the fact that the sole(s) of the humanoid robot do not fully contact the support surface, thereby improving the calculation accuracy of the measured pose parameters.

In one embodiment, the pose parameters of the waist of the humanoid robot collected by the above-mentioned IMU may include waist attitude angles and waist attitude angular velocities of the center point of the waist in the world coordinate system. The above-mentioned measured pose parameters obtained by kinematics solving may include measured position coordinates and a measured linear velocity of the humanoid robot.

The measured position coordinates of the humanoid robot can be calculated by using the attitude angles of the waist of the humanoid robot, combining the coordinates of the contact point(s) of the sole(s) of the foot calculated above, and the displacement parameters of the sole(s) of the humanoid robot included in the plantar motion parameters of the humanoid robot.

For example, in some embodiments, when the humanoid robot executes step S403, the humanoid robot can perform kinematics solving as described above by using the attitude angles of the waist of the humanoid robot and the displacement parameters of the sole(s) of the humanoid robot to obtain the plantar attitude angles of the humanoid robot.

Then, the humanoid robot can perform kinematic solving based on the contact point coordinates of the sole(s), the plantar attitude angles, and the displacement parameters of the sole(s) obtained above, to obtain the measured position coordinates of the center point of the waist.

Exemplarily, the humanoid robot can perform coordinate conversion according to the coordinates of the contact point(s) of the sole(s) and the plantar attitude angles, so as to obtain the position coordinates of the sole(s) in the world coordinate system. The equation for the coordinate conversion above can be as follows: $r_{F}^{G}=r_{Contact}^{G}-R_{F}^{G}r_{Contact}^{F}$, where $R_{F}^{G}$ represents a first attitude matrix transformed from a sole coordinate system {F} to the world coordinate system {G}, and its value can be calculated based on the plantar attitude angles.

Then, the humanoid robot can perform kinematics solving according to the position coordinates of the soles in the world coordinate system, the first attitude matrix, and the displacement parameters of the sole(s), so as to obtain the measured position coordinates of the center point of the waist in the world coordinate system.

In addition, the measured linear velocity of the humanoid robot can be calculated by using the waist angular velocities of the humanoid robot, the coordinates of the contact point(s) of the sole(s) calculated above, and the plantar angular velocity parameters of the humanoid robot contained in the plantar motion parameters.

For example, the humanoid robot can first use the waist attitude angular velocities and the plantar angular velocity parameters for kinematics solving to obtain the attitude angular velocities of the humanoid robot. The attitude angular velocities may include a roll angular velocity in a roll direction, a pitch angular velocity in a pitch direction, and a yaw angular velocity in a yaw direction.

Next, the humanoid robot can perform kinematics solving according to the coordinates of the contact point(s) of the sole(s), the plantar attitude angles, the attitude angular velocities and the plantar angular velocity parameters, and obtain the measured linear velocity of the center point of the waist.

Exemplarily, the humanoid robot can first calculate the linear velocity of the sole(s) in the world coordinate system according to the coordinates of the contact point(s) of the sole(s), the above-mentioned first attitude matrix calculated according to the plantar attitude angles, and the attitude angular velocities. The equation for the calculation above can be as follows: $\dot{r}_{F}^{G}=-\hat{\dot{\theta}}_{F}^{G}R_{F}^{G}r_{Contact}^{F}$, where $\dot{r}_{F}^{G}$ represents the linear velocity of the sole(s) in the world coordinate system, $\hat{\dot{\theta}}_{F}^{G}$ represents cross product antisymmetric matrix corresponding to the attitude angular velocities. In one embodiment, $\hat{\dot{\theta}}_{F}^{G}$ can be expressed as follows:

$$\dot{\theta}_{F}^{G}=\begin{bmatrix}\dot{\theta}_{roll}\\\dot{\theta}_{pitch}\\\dot{\theta}_{yaw}\end{bmatrix},$$

$$\hat{\dot{\theta}}_{F}^{G}=\begin{bmatrix}0 & -\dot{\theta}_{yaw} & \dot{\theta}_{pitch}\\\dot{\theta}_{yaw} & 0 & -\dot{\theta}_{roll}\\-\dot{\theta}_{pitch} & \dot{\theta}_{roll} & 0\end{bmatrix},$$

where $\dot{\theta}_{F}^{G}$ represents attitude angular velocities, $\dot{\theta}_{roll}$, $\dot{\theta}_{pitch}$, and $\dot{\theta}_{yaw}$ represent the roll angular velocity, the pitch angular velocity, and the yaw angular velocity.

Then, the humanoid robot can perform kinematic solving based on the obtained linear velocity of the sole(s) in the world coordinate system, attitude angular velocities, and the plantar angular velocity parameters, so as to obtain the linear velocity of the center point of the waist in the world coordinate system.

In addition, in the above-mentioned embodiment, for example, the waist pose parameters of the humanoid robot collected by the IMU may include the waist attitude angles of the center point of the waist in the world coordinate system and the first waist linear acceleration in the waist coordinate system. Therefore, when the humanoid robot executes step S203, based on the obtained waist attitude angles of the center point of the waist and the first waist line acceleration, the predicted pose parameters of the center point of the waist can be calculated.

Figure 6:
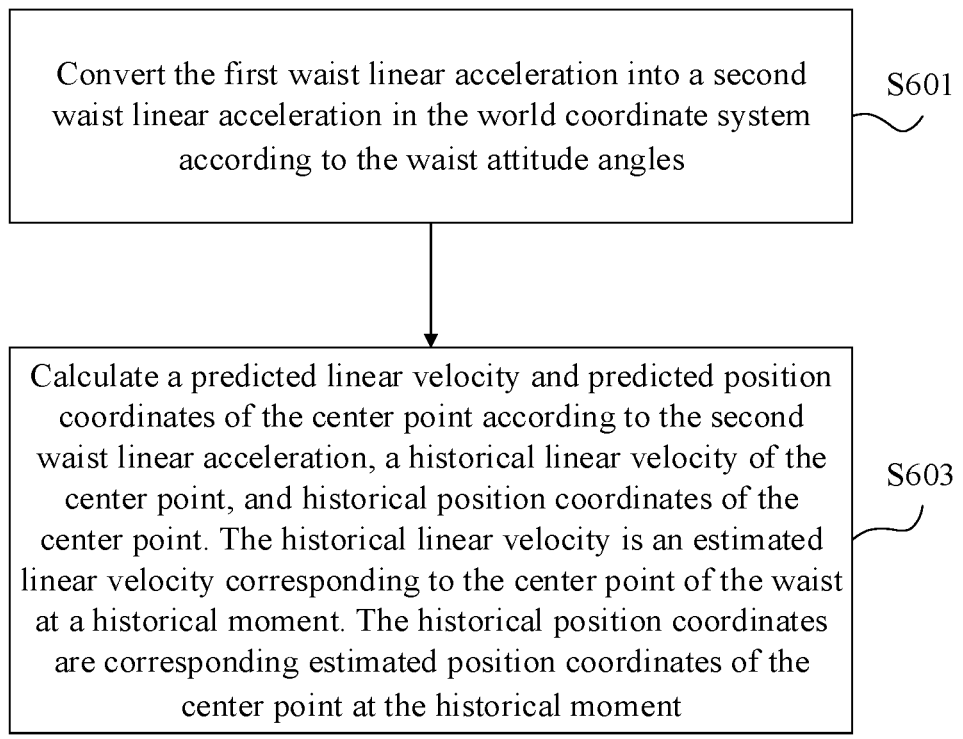
FIG. 6 is an exemplary flowchart of a method for calculating predicted pose parameters of the center point of the waist according to one embodiment.

Referring to FIG. 6, in one embodiment, step S203 may include the following steps.

Step S601: Convert the first waist linear acceleration into a second waist linear acceleration in the world coordinate system according to the waist attitude angles.

Step S603: Calculate a predicted linear velocity and predicted position coordinates of the center point according to the second waist linear acceleration, a historical linear velocity of the center point, and historical position coordinates of the center point. The historical linear velocity is an estimated linear velocity corresponding to the center point of the waist at a historical moment. The historical position coordinates are corresponding estimated position coordinates of the center point at the historical moment.

In one embodiment, the predicted attitude parameters of the humanoid robot may include the predicted linear velocity and the predicted position coordinates. The estimated pose parameters of the humanoid robot may include estimated position coordinates and estimated linear velocity.

In one embodiment, the humanoid robot can perform the pose estimation method described above every preset time interval $\Delta T$ to calculate the estimated pose parameters at the corresponding time point.

The humanoid robot can save each calculated estimated pose parameter, so that iterative calculation can be performed by using the saved estimated parameters of the k−1th moment to obtain the estimated parameters of the kth moment, where k is a positive integer greater than 1.

In addition, when the time interval $\Delta T$ is set small enough, the movement of the center point of the waist of the humanoid robot between two consecutive moments can be regarded as a uniform acceleration process. Therefore, the present disclosure can calculate the estimated pose parameters of the center point of the waist of the humanoid robot based on a uniform acceleration model.

In this way, when the humanoid robot executes step S203, it can first calculate a second attitude matrix according to the waist attitude angles, using the same calculation method as the above-mentioned calculation of the first attitude matrix $R_F^G$. The second attitude matrix $R_W^G$ is the attitude matrix converted from the waist coordinate system to the world coordinate system, so that the first waist linear acceleration in the waist coordinate system is converted to the second waist linear acceleration in the world coordinate system according to the obtained second attitude matrix $R_W^G$. The equation for the conversion is as follows: $\ddot{r}_W^G = R_W^G \ddot{r}^W + g^G$, where $R_W^G$ represents the second attitude matrix, $\ddot{r}_W^G$ represents the second waist linear acceleration, $\ddot{r}^W$ represents the first waist linear acceleration, and $g^G$ is the expression of gravitational acceleration in the world coordinate system $\{G\}$.

Next, the humanoid robot can calculate the predicted linear velocity and predicted position coordinates of the center point of the waist according to the second waist linear acceleration, the historical linear velocity of the center point of the waist, and the historical position coordinates of the center point of the waist.

As discussed above, the humanoid robot can save the estimated pose parameters calculated each time. When the estimated pose parameters at the kth moment is calculated, the estimated pose parameters at the k−1th moment can be used as the historical estimated parameters of the kth moment. Correspondingly, the estimated linear velocity at the k−1th moment is the historical linear velocity at the k-th moment, and the estimated position coordinates at the k−1th moment is the historical position coordinates at the k-th moment. In summary, the historical linear velocity in the present disclosure refers to the estimated linear velocity of waist center point of the waist at historical moments, and the historical position coordinates refers to the estimated position coordinates of the center point of the waist at historical moments.

In one embodiment, the equation for calculating the predicted pose parameters can be as follows: $\hat{x}_k' = A\hat{x}_{k-1}' + Bu_k$, where $\hat{x}_k'$ represents the predicted pose parameters, $$\hat{x}_k' = \begin{bmatrix} \hat{r}_W^{G'} \\ \hat{\dot{r}}_W^{G'} \end{bmatrix},$$

$\hat{r}_W^{G'}$ represents the predicted position coordinates, $\hat{\dot{r}}_W^{G'}$ represents the predicted linear velocity, $$\hat{x}_{k-1}' = \begin{bmatrix} \hat{r}_W^G \\ \hat{\dot{r}}_W^G \end{bmatrix},$$

represents historical position coordinates, $\hat{\dot{r}}_W^G$ represents historical linear velocity, $u_k = \ddot{r}_W^G$, $\ddot{r}_W^G$ represents the second waist linear acceleration, A and B represent state transition matrices.

In the above-mentioned example where the time interval between the k−1th moment and the kth moment is $\Delta T$, A and B can be expressed as follows:

$$A = \begin{bmatrix} 1 & 0 & 0 & \Delta T & 0 & 0 \\ 0 & 1 & 0 & 0 & \Delta T & 0 \\ 0 & 0 & 1 & 0 & 0 & \Delta T \\ 0 & 0 & 0 & 1 & 0 & 0 \\ 0 & 0 & 0 & 0 & 1 & 0 \\ 0 & 0 & 0 & 0 & 0 & 1 \end{bmatrix};$$

$$B = \begin{bmatrix} \frac{\Delta T^2}{2} & 0 & 0 \\ 0 & \frac{\Delta T^2}{2} & 0 \\ 0 & 0 & \frac{\Delta T^2}{2} \\ \Delta T & 0 & 0 \\ 0 & \Delta T & 0 \\ 0 & 0 & \Delta T \end{bmatrix}.$$

Figure 7:
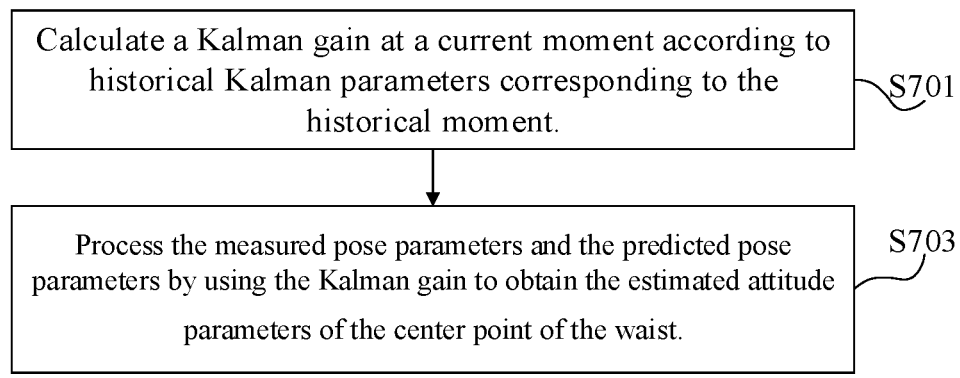
FIG. 7 is an exemplary flowchart of a method for fusing the measured pose parameters and the predicted pose parameters according to one embodiment.

Referring to FIG. 7, in one embodiment, step S205 may include the following steps.

Step S701: Calculate a Kalman gain at a current moment according to historical Kalman parameters corresponding to the historical moment.

Step S703: Process the measured pose parameters and the predicted pose parameters by using the Kalman gain to obtain the estimated attitude pose parameters of the center point of the waist.

In the above-mentioned model that regards the motion of the center point of the waist of the humanoid robot as a uniform acceleration process, the humanoid robot can not only continuously save each estimated pose parameter, but also save the Kalman parameters at each moment of calculating the estimated pose parameters, so that the humanoid robot can use the saved Kalman parameters at the k−1th moment to calculate the Kalman gain at kth moment.

For example, when the humanoid robot calculates the Kalman gain at the current moment, the equation for the calculation can be as follows: $k_k = P_k' H^T (H P_k' H^T + R)^{-1}$, where $k_k$ represents Kalman gain, $P_k'$ represents the error covariance matrix between the predicted value and the estimated value output by the Kalman filter, H represents an observation matrix, and R represents a measurement noise covariance matrix.

In one embodiment, the equation for calculating the error covariance matrix between the predicted value and the estimated value output by the Kalman filter can be as follows: $P_k' = A P_{k-1} A^T + Q$, where $P_{k-1}$ represents historical Kalman parameters, A represents the state transition matrix according to the setting, that is, $\Delta T$ in the above-mentioned example, and Q represents a system noise covariance matrix.

Therefore, the humanoid robot can use the Kalman gain obtained from the above-mentioned calculation to process the measured pose parameters and predicted pose parameters obtained above, so as to obtain the estimated pose parameter of the center point of the waist of the humanoid robot.

In one embodiment, the equation to calculate the estimated pose parameters can be as follows: $\hat{x}_k = \hat{x}_k' + K_k(Z_k - H\hat{x}_k')$, where $\hat{x}_k$ represents estimated pose parameters, and its dimension is 6×1;

$$\hat{x}_k = \begin{bmatrix} \hat{r}_W^G \\ \hat{\dot{r}}_W^G \end{bmatrix},$$

$\hat{r}_W^G$ represents estimated position coordinates, $\hat{\dot{r}}_W^G$ represents estimated linear velocity, $\hat{x}_k'$ represents predicted pose parameters, $K_k$ represents Kalman gain, $Z_k$ represents measured pose parameters, and H represents the observation matrix.

In one embodiment, the observed parameters of the humanoid robot may include position coordinates and linear velocity in three-dimensional space. The observation matrix H can be expressed as follows:

$$H = \begin{bmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{bmatrix}$$

As discussed above, when the humanoid robot calculates the estimated pose parameters at the kth moment, it can not only save the estimated pose parameters at the kth moment as the historical estimated parameters at the k+1th moment, but also save the Kalman parameters for calculation of the Kalman gain at the k+1th moment.

Therefore, in one embodiment, the humanoid robot can also calculate the Kalman parameters at the current moment according to the above-mentioned Kalman gain at the current moment, and save the Kalman parameters at the current moment.

Exemplarily, the equation for the humanoid robot to calculate the Kalman parameters at the current moment can be as follows: $P_k = (1 - K_k H) P_k'$, where $P_k$ represents the Kalman parameters at the current moment, and I represents the identity matrix.

It should be noted that when the humanoid robot includes at least two legs, different feet of the legs alternately touch the support surface, which will also affect the estimation of the waist pose parameters of the humanoid robot.

Therefore, in some embodiments, when the humanoid robot executes step 201, the obtained waist pose parameters of the humanoid robot and the plantar motion parameters corresponding to the supporting leg(s) of at least two legs can be processed to obtain the measured pose parameters of the center point of the waist.

In other words, when the humanoid robot executes step 201, the humanoid robot uses the leg(s) supporting the humanoid robot to calculate the measured pose parameters. As a result, the estimated pose parameters calculated by the humanoid robot can be more consistent with the actual situation, resulting in higher estimation accuracy of the waist pose parameters of the humanoid robot.

In one embodiment, when the humanoid robot has multiple supporting legs in contact with the support surface, the humanoid robot can first calculate an initial estimated parameter according to each supporting leg, and then combine all the initial estimated parameters to obtain the estimate pose parameters.

It should be noted that the supporting legs can be determined by the humanoid robot receiving instruction information from some other devices, or can be determined by the humanoid robot by executing some determination algorithms.

For example, taking the humanoid robot with two legs shown in FIG. 3 as an example, six-dimensional force sensors can be arranged on the two legs of the humanoid robot to collect the force of the two legs of the humanoid robot in the Z direction respectively.

When the Z-direction force of the left leg is greater than the Z-direction force of the right leg, and the difference between them exceeds a threshold value, it can be determined that the left leg of the humanoid robot is the supporting leg in contact with the support surface. When the Z-direction force of the right leg is greater than the Z-direction force of the left leg, and the difference between them exceeds a threshold value, it can be determined that the right leg of the humanoid robot is the supporting leg in contact with the support surface. When the absolute value between the Z-direction force of the right leg and the Z-direction force of the left leg is less than or equal to the threshold value, it can be determined that both legs of the humanoid robot are supporting legs in contact with the support surface.

Referring to FIG. 8, in one embodiment, a robot pose estimation device 300 may include a processing module 301 and an estimation module 302. The processing module 301 is to process obtained pose parameters of a waist of the humanoid robot and plantar motion parameters of the humanoid robot to obtain the measured pose parameters of a center point of the waist of the humanoid robot. The processing module 301 is further to calculate predicted pose parameters of the center point of the waist according to the obtained pose parameters of the waist. The estimation module 302 is to fuse the measured pose parameters and the predicted pose parameters to obtain estimated pose parameters of the center point of the waist.

In one embodiment, the processing module 301 is further to: solve kinematics by using the pose parameters of the waist and the plantar motion parameters to obtain contact point coordinates, wherein the contact point coordinates are coordinates of a contact point between a sole of the humanoid robot and a support surface in a world coordinate system; and solve kinematics by using the contact point coordinates, the pose parameters of the waist and the plantar motion parameters to obtain the measured pose parameters of the center point of the waist.

In one embodiment, the pose parameters of the waist may include waist attitude angles and waist attitude angular velocities of the center point of the waist in the world coordinate system.

In one embodiment, the processing module 301 is further to: solve kinematics by using the waist attitude angles, the contact point coordinates, and the plantar motion parameters to obtain measured position coordinates of the center point of the waist; and solve kinematics by using the waist attitude angular velocities, the contact point coordinates, and the plantar motion parameters to obtain a measured linear velocity of the center point of the waist.

In one embodiment, the measured pose parameters of the center point of the waist may include the measured position coordinates and the measured linear velocity.

In one embodiment, the plantar motion parameters may include plantar displacement parameters of the humanoid robot.

The processing module 301 is further to: solve kinematics by using the pose parameters of the waist and the plantar displacement parameters to obtain plantar attitude angles of the humanoid robot; and find initial contact point coordinates corresponding to the plantar attitude angles in a preset pose configuration strategy. The initial contact point coordinates are the coordinates of the contact point between the sole of the humanoid robot and the support surface in a sole coordinate system. The sole coordinate system is a coordinate system established according to the sole of the humanoid robot, and the preset pose configuration strategy comprise the coordinates of the contact point in the sole coordinate system when the sole is in different poses.

In one embodiment, the pose parameters of the waist may include waist attitude angles of the center point in a world coordinate system and a first waist linear acceleration in a waist coordinate system established according to the center point.

In one embodiment, the processing module 301 is further to: convert the first waist linear acceleration into a second waist linear acceleration in the world coordinate system according to the waist attitude angles; and calculate a predicted linear velocity and predicted position coordinates of the center point according to the second waist linear acceleration, a historical linear velocity of the center point, and historical position coordinates of the center point. The historical linear velocity is an estimated linear velocity corresponding to the center point of the waist at a historical moment, the historical position coordinates are corresponding estimated position coordinates of the center point at the historical moment, and the predicted attitude parameters may include the predicted linear velocity and the predicted position coordinates.

In one embodiment, the estimation module 302 is further to calculate a Kalman gain at a current moment according to historical Kalman parameters corresponding to the historical moment; and process the measured pose parameters and the predicted pose parameters by using the Kalman gain to obtain the estimated pose parameters of the center point of the waist.

In one embodiment, the processing module 301 is further to process the obtained pose parameters of the waist and plantar motion parameters corresponding to a support leg of at least two feet of the humanoid robot to obtain the measured pose parameters of the center point of the waist. The support leg is one of the at least two legs that supports the humanoid robot on a support surface.

It should be noted that the basic principles and technical effects of the robot pose estimation device are the same as the aforementioned method. For a brief description, for parts not mentioned in this device embodiment, reference can be made to corresponding description in the method embodiments.

It should be noted that content such as information exchange between the modules/units and the execution processes thereof is based on the same idea as the method embodiments of the present disclosure, and produces the same technical effects as the method embodiments of the present disclosure. For the specific content, refer to the foregoing description in the method embodiments of the present disclosure. Details are not described herein again.

Another aspect of the present disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It should be understood that the disclosed device and method can also be implemented in other manners. The device embodiments described above are merely illustrative. For example, the flowcharts and block diagrams in the accompanying drawings illustrate the architecture, functionality and operation of possible implementations of the device, method and computer program product according to embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition, functional modules in the embodiments of the present disclosure may be integrated into one independent part, or each of the modules may be independent, or two or more modules may be integrated into one independent part. in addition, functional modules in the embodiments of the present disclosure may be integrated into one independent part, or each of the modules may exist alone, or two or more modules may be integrated into one independent part. When the functions are implemented in the form of a software functional unit and sold or used as an independent product, the functions may be stored in a computer-readable storage medium. Based on such an understanding, the technical solutions in the present disclosure essentially, or the part contributing to the prior art, or some of the technical solutions may be implemented in a form of a software product. The computer software product is stored m a storage medium and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

A person skilled in the art can clearly understand that for the purpose of convenient and brief description, for specific working processes of the device, modules and units described above, reference may be made to corresponding processes in the embodiments of the foregoing method, which are not repeated herein.

In the embodiments above, the description of each embodiment has its own emphasis. For parts that are not detailed or described in one embodiment, reference may be made to related descriptions of other embodiments.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random-access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for estimating a pose of a humanoid robot to control the humanoid robot, wherein the humanoid robot comprises: a processor, an inertial measurement unit arranged at a center point of a waist of the humanoid robot, and detection sensors arranged at each joint of the humanoid robot, and wherein the method comprises:
obtaining, through the inertial measurement unit, pose parameters of the waist of the humanoid robot, and obtaining, through the detection sensors, plantar motion parameters of the humanoid robot;
processing, through the processor, the pose parameters of the waist of the humanoid robot and the plantar motion parameters of the humanoid robot to obtain measured pose parameters of the center point of the waist of the humanoid robot, wherein the pose parameters of the waist comprise waist attitude angles and waist attitude angular velocities of the center point of the waist in a world coordinate system, and wherein the measured pose parameters of the center point of the waist comprise: measured position coordinates of the center point of the waist obtained by using the waist attitude angles and the plantar motion parameters, and a measured linear velocity of the center point of the waist obtained by using the waist attitude angular velocities and the plantar motion parameters;
calculating, through the processor, predicted pose parameters of the center point of the waist according to the pose parameters of the waist; and
fusing, through the processor, the measured pose parameters and the predicted pose parameters to obtain estimated pose parameters of the center point of the waist, and controlling, through the processor, the humanoid robot to move according to the estimated pose parameters of the center point of the waist.

2. The method of claim 1, wherein processing, through the processor, the pose parameters of the waist of the humanoid robot and the plantar motion parameters of the humanoid robot to obtain the measured pose parameters of the center point of the waist of the humanoid robot, comprises:
solving, through the processor, kinematics by using the pose parameters of the waist and the plantar motion parameters to obtain contact point coordinates, wherein the contact point coordinates are coordinates of a contact point between a sole of the humanoid robot and a support surface in the world coordinate system; and
solving, through the processor, kinematics by using the contact point coordinates, the pose parameters of the waist and the plantar motion parameters to obtain the measured pose parameters of the center point of the waist.

3. The method of claim 2, wherein solving, through the processor, kinematics by using the contact point coordinates, the pose parameters of the waist and the plantar motion parameters to obtain the measured pose parameters of the center point of the waist, comprises:
solving, through the processor, kinematics by using the waist attitude angles, the contact point coordinates, and the plantar motion parameters to obtain the measured position coordinates of the center point of the waist; and
solving, through the processor, kinematics by using the waist attitude angular velocities, the contact point coordinates, and the plantar motion parameters to obtain the measured linear velocity of the center point of the waist.

4. The method of claim 2, wherein the plantar motion parameters comprise plantar displacement parameters of the humanoid robot; and solving, through the processor, kinematics by using the pose parameters of the waist and the plantar motion parameters to obtain the contact point coordinates, comprises:
solving, through the processor, kinematics by using the pose parameters of the waist and the plantar displacement parameters to obtain plantar attitude angles of the humanoid robot;
finding, through the processor, initial contact point coordinates corresponding to the plantar attitude angles in a preset pose configuration strategy, wherein the initial contact point coordinates are the coordinates of the contact point between the sole of the humanoid robot and the support surface in a sole coordinate system, the sole coordinate system is a coordinate system established according to the sole of the humanoid robot, and the preset pose configuration strategy comprise pre-configured coordinates of the contact point in the sole coordinate system when the sole is in different poses.

5. The method of claim 1, wherein the pose parameters of the waist further comprise a first waist linear acceleration in a waist coordinate system established according to the center point; and calculating, through the processor, the predicted pose parameters of the center point of the waist according to the pose parameters of the waist, comprises:
converting, through the processor, the first waist linear acceleration into a second waist linear acceleration in the world coordinate system according to the waist attitude angles; and
calculating, through the processor, a predicted linear velocity and predicted position coordinates of the center point according to the second waist linear acceleration, a historical linear velocity of the center point, and historical position coordinates of the center point, wherein the historical linear velocity is an estimated linear velocity corresponding to the center point of the waist at a historical moment, the historical position coordinates are corresponding estimated position coordinates of the center point at the historical moment, and the predicted attitude parameters comprise the predicted linear velocity and the predicted position coordinates.

6. The method of claim 1, wherein fusing, through the processor, the measured pose parameters and the predicted pose parameters to obtain the estimated pose parameters of the center point of the waist, comprises:
calculating, through the processor, a Kalman gain at a current moment according to historical Kalman parameters corresponding to the historical moment; and
processing, through the processor, the measured pose parameters and the predicted pose parameters by using the Kalman gain to obtain the estimated pose parameters of the center point of the waist.

7. The method of claim 1, wherein processing, through the processor, the pose parameters of the waist of the humanoid robot and the plantar motion parameters of the humanoid robot to obtain the measured pose parameters of the center point of the waist of the humanoid robot, comprises:
processing, through the processor, the pose parameters of the waist and plantar motion parameters corresponding to a support leg of at least two feet of the humanoid robot to obtain the measured pose parameters of the center point of the waist, wherein the support leg is one of the at least two legs that supports the humanoid robot on a support surface.

8. The method of claim 1, wherein the detection sensors comprise displacement sensors installed on legs of the humanoid robot, and the plantar motion parameters of the humanoid robot are obtained by the displacement sensors.

9. A humanoid robot comprising:
one or more processors;
an inertial measurement unit arranged at a center point of a waist of the humanoid robot and coupled to the one or more processors;
detection sensors arranged at each joint of the humanoid robot and coupled to the one or more processors; and
a memory coupled to the one or more processors, the memory storing programs that, when executed by the one or more processors, cause performance of operations comprising:
obtaining, through the inertial measurement unit, pose parameters of the waist of the humanoid robot, and obtaining, through the detection sensors, plantar motion parameters of the humanoid robot;
processing the pose parameters of the waist of the humanoid robot and the plantar motion parameters of the humanoid robot to obtain measured pose parameters of the center point of the waist of the humanoid robot, wherein the pose parameters of the waist comprise waist attitude angles and waist attitude angular velocities of the center point of the waist in a world coordinate system, and wherein the measured pose parameters of the center point of the waist comprise: measured position coordinates of the center point of the waist obtained by using the waist attitude angles and the plantar motion parameters, and a measured linear velocity of the center point of the waist obtained by using the waist attitude angular velocities and the plantar motion parameters;
calculating predicted pose parameters of the center point of the waist according to the pose parameters of the waist; and
fusing the measured pose parameters and the predicted pose parameters to obtain estimated pose parameters of the center point of the waist, and controlling the humanoid robot to move according to the estimated pose parameters of the center point of the waist.

10. The humanoid robot of claim 9, wherein processing the pose parameters of the waist of the humanoid robot and the plantar motion parameters of the humanoid robot to obtain the measured pose parameters of the center point of the waist of the humanoid robot, comprises:
solving kinematics by using the pose parameters of the waist and the plantar motion parameters to obtain contact point coordinates, wherein the contact point coordinates are coordinates of a contact point between a sole of the humanoid robot and a support surface in the world coordinate system; and
solving kinematics by using the contact point coordinates, the pose parameters of the waist and the plantar motion parameters to obtain the measured pose parameters of the center point of the waist.

11. The humanoid robot of claim 10, wherein solving kinematics by using the contact point coordinates, the pose parameters of the waist and the plantar motion parameters to obtain the measured pose parameters of the center point of the waist, comprises:
solving kinematics by using the waist attitude angles, the contact point coordinates, and the plantar motion parameters to obtain the measured position coordinates of the center point of the waist; and
solving kinematics by using the waist attitude angular velocities, the contact point coordinates, and the plantar motion parameters to obtain the measured linear velocity of the center point of the waist.

12. The humanoid robot of claim 10, wherein the plantar motion parameters comprise plantar displacement parameters of the humanoid robot; and solving kinematics by using the pose parameters of the waist and the plantar motion parameters to obtain contact point coordinates, comprises:
solving kinematics by using the pose parameters of the waist and the plantar displacement parameters to obtain plantar attitude angles of the humanoid robot;
finding initial contact point coordinates corresponding to the plantar attitude angles in a preset pose configuration strategy, wherein the initial contact point coordinates are the coordinates of the contact point between the sole of the humanoid robot and the support surface in a sole coordinate system, the sole coordinate system is a coordinate system established according to the sole of the humanoid robot, and the preset pose configuration strategy comprise pre-configured coordinates of the contact point in the sole coordinate system when the sole is in different poses.

13. The humanoid robot of claim 9, wherein the pose parameters of the waist further comprise a first waist linear acceleration in a waist coordinate system established according to the center point; and calculating the predicted pose parameters of the center point of the waist according to the pose parameters of the waist, comprises:
converting the first waist linear acceleration into a second waist linear acceleration in the world coordinate system according to the waist attitude angles; and
calculating a predicted linear velocity and predicted position coordinates of the center point according to the second waist linear acceleration, a historical linear velocity of the center point, and historical position coordinates of the center point, wherein the historical linear velocity is an estimated linear velocity corresponding to the center point of the waist at a historical moment, the historical position coordinates are corresponding estimated position coordinates of the center point at the historical moment, and the predicted attitude parameters comprise the predicted linear velocity and the predicted position coordinates.

14. The humanoid robot of claim 9, wherein fusing the measured pose parameters and the predicted pose parameters to obtain the estimated pose parameters of the center point of the waist, comprises:
calculating a Kalman gain at a current moment according to historical Kalman parameters corresponding to the historical moment; and
processing the measured pose parameters and the predicted pose parameters by using the Kalman gain to obtain the estimated pose parameters of the center point of the waist.

15. The humanoid robot of claim 9, wherein processing the pose parameters of the waist of the humanoid robot and the plantar motion parameters of the humanoid robot to obtain the measured pose parameters of the center point of the waist of the humanoid robot, comprises:
processing the pose parameters of the waist and plantar motion parameters corresponding to a support leg of at least two feet of the humanoid robot to obtain the measured pose parameters of the center point of the waist, wherein the support leg is one of the at least two legs that supports the humanoid robot on a support surface.

16. A non-transitory computer-readable storage medium storing instructions that, when executed by at least one processor of a humanoid robot, cause the at least one processor to perform a method, wherein the humanoid robot comprises: a processor, an inertial measurement unit arranged at a center point of a waist of the humanoid robot, and detection sensors arranged at each joint of the humanoid robot, and wherein the method comprises:
obtaining, through the inertial measurement unit, pose parameters of the waist of the humanoid robot, and obtaining, through the detection sensors, plantar motion parameters of the humanoid robot;
processing the pose parameters of the waist of the humanoid robot and the plantar motion parameters of the humanoid robot to obtain measured pose parameters of the center point of the waist of the humanoid robot;
calculating predicted pose parameters of the center point of the waist according to the pose parameters of the waist; and
fusing the measured pose parameters and the predicted pose parameters to obtain estimated pose parameters of the center point of the waist, and controlling the humanoid robot to move according to the estimated pose parameters of the center point of the waist;
wherein the pose parameters of the waist comprise waist attitude angles of the center point in a world coordinate system and a first waist linear acceleration in a waist coordinate system established according to the center point; and calculating the predicted pose parameters of the center point of the waist according to the pose parameters of the waist, comprises:
converting the first waist linear acceleration into a second waist linear acceleration in the world coordinate system according to the waist attitude angles; and
calculating a predicted linear velocity and predicted position coordinates of the center point according to the second waist linear acceleration, a historical linear velocity of the center point, and historical position coordinates of the center point, wherein the historical linear velocity is an estimated linear velocity corresponding to the center point of the waist at a historical moment, the historical position coordinates are corresponding estimated position coordinates of the center point at the historical moment, and the predicted attitude parameters comprise the predicted linear velocity and the predicted position coordinates.

17. The non-transitory computer-readable storage medium of claim 16, wherein processing the pose parameters of the waist of the humanoid robot and the plantar motion parameters of the humanoid robot to obtain the measured pose parameters of the center point of the waist of the humanoid robot, comprises:
solving kinematics by using the pose parameters of the waist and the plantar motion parameters to obtain contact point coordinates, wherein the contact point coordinates are coordinates of a contact point between a sole of the humanoid robot and a support surface in the world coordinate system; and
solving kinematics by using the contact point coordinates, the pose parameters of the waist and the plantar motion parameters to obtain the measured pose parameters of the center point of the waist.

18. The non-transitory computer-readable storage medium of claim 17, wherein the pose parameters of the waist further comprise waist attitude angular velocities of the center point of the waist in the world coordinate system; and solving kinematics by using the contact point coordinates, the pose parameters of the waist and the plantar motion parameters to obtain the measured pose parameters of the center point of the waist, comprises:
solving kinematics by using the waist attitude angles, the contact point coordinates, and the plantar motion parameters to obtain measured position coordinates of the center point of the waist; and
solving kinematics by using the waist attitude angular velocities, the contact point coordinates, and the plantar motion parameters to obtain a measured linear velocity of the center point of the waist, wherein the measured pose parameters of the center point of the waist comprise the measured position coordinates and the measured linear velocity.

19. The non-transitory computer-readable storage medium of claim 17, wherein the plantar motion parameters comprise plantar displacement parameters of the humanoid robot; and solving kinematics by using the pose parameters of the waist and the plantar motion parameters to obtain the contact point coordinates, comprises:
solving kinematics by using the pose parameters of the waist and the plantar displacement parameters to obtain plantar attitude angles of the humanoid robot;
finding initial contact point coordinates corresponding to the plantar attitude angles in a preset pose configuration strategy, wherein the initial contact point coordinates are the coordinates of the contact point between the sole of the humanoid robot and the support surface in a sole coordinate system, the sole coordinate system is a coordinate system established according to the sole of the humanoid robot, and the preset pose configuration strategy comprise pre-configured coordinates of the contact point in the sole coordinate system when the sole is in different poses.

20. The non-transitory computer-readable storage medium of claim 16, wherein fusing the measured pose parameters and the predicted pose parameters to obtain the estimated pose parameters of the center point of the waist, comprises:
calculating a Kalman gain at a current moment according to historical Kalman parameters corresponding to the historical moment; and
processing the measured pose parameters and the predicted pose parameters by using the Kalman gain to obtain the estimated pose parameters of the center point of the waist.

* * * * *